United States Patent
Hirono et al.

Patent Number: 5,946,282
Date of Patent: Aug. 31, 1999

[54] OPTICAL RECORDING/REPRODUCING APPARATUS

[75] Inventors: Masatoshi Hirono, Chiba-ken; Yoriyuki Ishibashi, Kanagawa-ken, both of Japan

[73] Assignee: Kabushiki Kaisha Toshiba, Kawasaki, Japan

[21] Appl. No.: 09/121,895

[22] Filed: Jul. 24, 1998

[30] Foreign Application Priority Data

| Jul. 24, 1997 | [JP] | Japan | 9-198890 |
| Nov. 17, 1997 | [JP] | Japan | 9-315438 |

[51] Int. Cl.$^6$ ............................................. G11B 7/00
[52] U.S. Cl. ..................... 369/112; 369/118; 369/44.23
[58] Field of Search .................................. 369/118, 44.23, 369/112

[56] References Cited

U.S. PATENT DOCUMENTS

| 4,176,960 | 12/1979 | Eckbreth et al. | 356/338 |
| 5,125,750 | 6/1992 | Corle et al. | 369/43 |
| 5,602,819 | 2/1997 | Inagaki et al. | 369/112 |
| 5,734,637 | 3/1998 | Ootaki et al. | 369/118 |
| 5,748,603 | 5/1998 | Kim et al. | 369/112 |
| 5,764,613 | 6/1998 | Yamamoto et al. | 369/112 |
| 5,796,683 | 8/1998 | Sumi et al. | 369/118 |

OTHER PUBLICATIONS

Lipson, et al., "Improving the resolution", Optical Physics, 1995, 3rd ed. Chap 12, (Fig. 12.26 and pp. 359–361).

Primary Examiner—Tod R. Swann
Assistant Examiner—Kim-Kwok Chu
Attorney, Agent, or Firm—Pillsbury Madison & Sutro LLP

[57] ABSTRACT

An optical recording/reproduction apparatus records and reproduces information onto and from an associated recording medium by use of light from a light source. The apparatus includes a lens capable of generating an evanescent wave which is disposed in a light path from the light source to the recording medium, and a partial beam light intercepter for intercepting at least part of the light passing through the lens without contributing to generation of the evanescent wave. The light intercepter blocks the center part of a laser beam incident to the evanescent wave generating lens, thus reshaping it into a beam of hollow annular cross-section. This improves the optical resolution of the record/reproduction apparatus.

10 Claims, 10 Drawing Sheets

OUTER TRANSMITTANCE

Fig. 19

$$\frac{\text{OUTER TRANSMITTANCE}}{\text{INNER TRANSMITTANCE}} = \frac{I_2}{I_1}$$

$$\frac{\text{OUTER TRANSMITTANCE}}{\text{INNER TRANSMITTANCE}} = \frac{I_2}{I_1}$$

OPTICAL RECORDING/REPRODUCING APPARATUS

BACKGROUND OF THE INVENTION

1. Field of the Invention

The present invention relates to an optical recording/reproducing apparatus, and more particularly to an optical recording/reproducing apparatus employing an evanescent wave generating lens for recording and reproducing information signals to and from an optical recording media, such as an optical disk.

2. Discussion of the Background

Today, in the field of information recording, a variety of technological advances have been made for high-density recording. In order to achieve the intended high-density information recording in a limited region of recording medium, a light beam emitted from a laser beam source, such as a semiconductor laser, is reduced or minimized in spot size. One approach to fulfilling such demands is to employ a recently developed recording/reproducing technique which makes use of evanescent wave to form a minuscule laser spot on the medium.

This technique is designed to employ a specific type of lens capable of generating an evanescent wave (referred to as the "evanescent wave generating lens" hereinafter), which utilizes an evanescent wave that is producible due to the total internal reflection of light inside the lens. Note that the evanescent wave generating lens is generally called a solid immersion lens (SIL) among those skilled in the art. The resultant evanescent wave produced by such lens is capable of forming a fine or sub-micro spot on the surface of an optical recording medium used, such as an optical disk, which in turn increases the recording density of information being recorded on the recording medium.

However, the prior known approach encounters a problem in that the efficiency of evanescent wave generation remains deficient.

Figure 1:
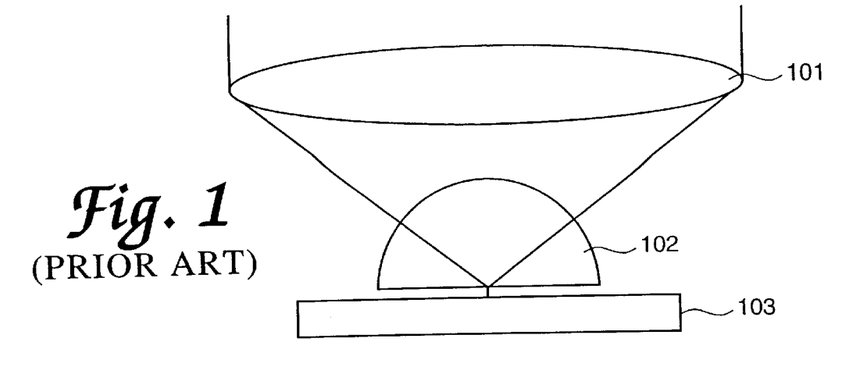
FIG. 1 is a diagram schematically showing a configuration of a typical prior art optical system employing a hemispherical lens serving as an evanescent wave generating lens.

FIG. 1 is a diagram schematically depicting a prior art optical system which employs a hemispherical lens acting as the evanescent wave generating lens. As shown herein, rays of incident light are collected by an objective lens 101 and guided to perpendicularly enter the curved surface of an evanescent wave generating lens 102, and then are focused inside the hemispherical lens 102 for forming a light spot on the recording surface of a recording medium 103 via evanescent wave. The evanescent wave generating lens 102 is a hemispherical lens.

Figure 2:
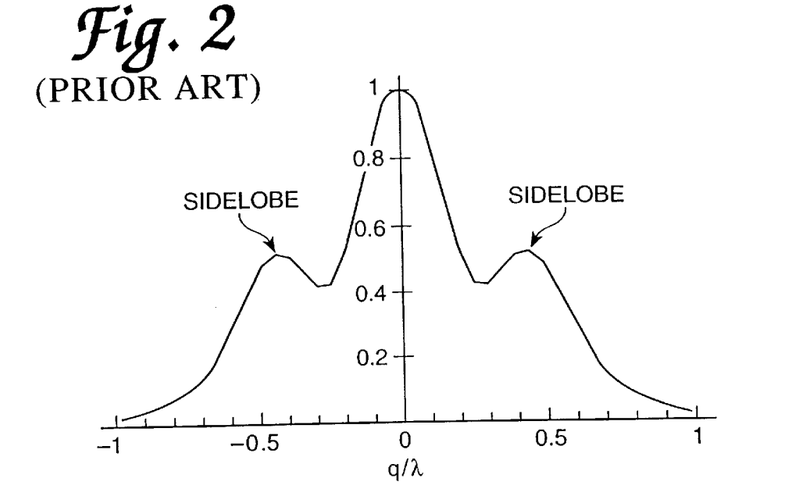
FIG. 2 is a graph showing a normalized intensity distribution of a light spot in the prior art optical system of FIG. 1.

FIG. 2 is a graph showing a normalized distribution profile of the normalized beam intensity of the light spot of the optical system of FIG. 1. The intensity distribution is obtained both the hemispherical lens 102 and the recording medium 103 are set at approximately 1.88, an air gap distance between the hemispherical lens 102 and the recording medium 103 is about 0.3 times the wavelength of incidence light, and the incidence angle of "marginal" light rays inside the hemispherical lens 102 is set at 57.6 degrees. Note here that the horizontal axis of the graph of FIG. 2 represents positions (q/λ) as measured along the radial direction inside the surface of the recording medium 103.

It is understood from FIG. 2 that the resulting intensity distribution of beam spot has a plurality of peaks along the radial direction inside the surface of the recording medium 103, including one central maxima and two smaller peaks on its opposite sides. These side peaks are called the "sidelobes" by one skilled in the art. Sidelobes may lower optical resolution.

In this way, the prior art optical system suffers from a problem: it remains difficult to readily increase the optical resolution of the recording/reproducing apparatus due to generation of such sidelobes.

The present invention has been made in view of the above, and a primary object of the present invention is to provide an improved optical recording/reproduction apparatus with improved optical resolution.

SUMMARY OF THE INVENTION

To attain the foregoing object the present invention provides a recording/reproducing apparatus for recording/reproducing information onto a recording medium by emitting a laser beam generated by a beam source, comprising an evanescent wave generating lens disposed between the beam source and the recording medium and in a light path of the laser beam, for generating an evanescent wave by transmitting the laser beam. The apparatus also comprises a partial beam intercepter disposed in the light path, for intercepting an axial portion of the laser beam to generate a hollow beam for transmission to the recording medium.

The partial beam intercepter may be provided to intercept a portion of the laser beam transmitted from the evanescent wave generating lens at an angle less than a predetermined angle relative to an axis of the laser beam. The partial beam intercepter and the evanescent wave generating lens may be integrally formed as one unit. Also, the partial beam intercepter and the objective lens may be integrally formed as one unit.

In accordance with one aspect of the present invention, an objective lens may be disposed between the light source and the evanescent wave generating lens for concentrating the laser beam on the evanescent wave generating lens.

In accordance with another aspect of the invention, the partial beam intercepter may be a liquid crystal shutter.

The present invention may also include a meniscus lens in front of the evanescent wave generating lens or at the post stage of the objective lens.

The light intercepter unit may be provided separately or integrally formed with the evanescent wave generating lens. Alternatively, the light intercepter may either be disposed between the evanescent wave generating lens and the beam source, or the intercepter may be provided on the objective lens. The intercepter may also be disposed between the objective lens and the beam source.

In accordance with a further aspect of the present invention, the intercepter varies a partial beam intercept area, thereby permitting light to vary in block area. The intercepter may be, for example, a liquid crystal shutter.

Furthermore, the present invention also provides an optical recording/reproduction method for performing recording and reproduction (writing/reading) of information to and from a recording medium using a beam of light emitted from a light source, including blocking or "intercepting" at least part of the light from the source, permitting the remaining rays of light other than the blocked rays to pass through an evanescent wave generator lens, and irradiating resultant light rays to pass through the lens onto the recording medium.

Because the present invention may prevent any rays of light that do not contribute to producing the intended evanescent wave from reaching the evanescent wave generating lens, an optical recording/reproduction method and apparatus may be achievable with the optical resolution greatly enhanced or maximized.

BRIEF DESCRIPTION OF THE DRAWINGS

These and other objects, features and advantages of the invention will be apparent from the following more particular description of preferred embodiments of the present invention, as illustrated in the accompanying drawings.

DETAILED DESCRIPTION OF THE PREFERRED EMBODIMENTS

Some preferred embodiments of the present invention are described in detail with reference to the accompanying drawings.

Figure 3:
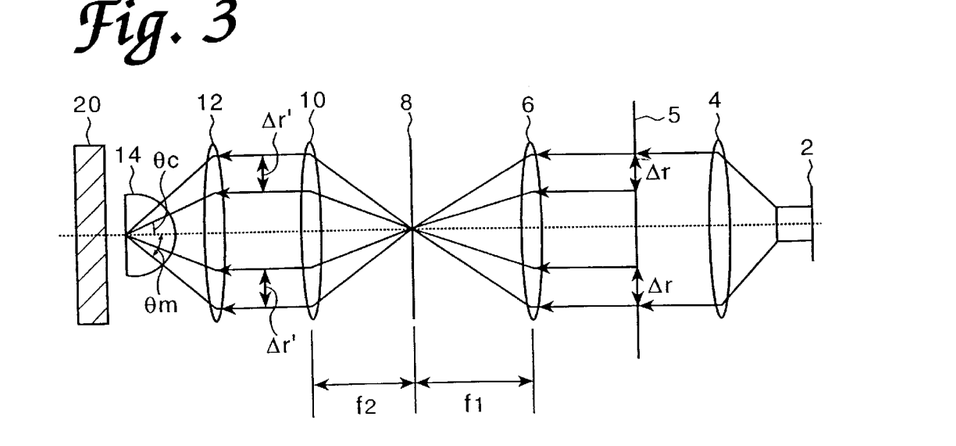
FIG. 3 is a cross-sectional view showing an overall configuration of an optical recording/reproducing apparatus in accordance with one preferred embodiment of the present invention.

FIG. 3 is a cross-sectional view illustrating an optical recording/reproducing apparatus in accordance with one preferred embodiment of the present invention. The recording/reproduction apparatus includes a light source 2, a collimator lens 4, an annular aperture 5, a condenser lens 6, a pin-hole section 8, a collimator lens 10, an objective lens 12, and a hemispherical lens 14. The light source 2 may be, for example, a semiconductor laser. The annular aperture 5 may be, for example, a diaphragm formed into an annular shape. Here, the hemispherical lens 14 may correspond to an evanescent wave generating lens, such as, a solid immersion lens (SIL). Incoming rays of light exiting the hemispherical lens 14 forms a light spot on a recording medium 20. A series of the foregoing optical components defines the optical path of a beam of laser beam.

The light source 2 emits a laser beam that is modulated by superimposing an information signal thereto. The laser beam emitted is optically guided to reach the collimator lens 4 for shaping and converting into a collimated light beam, which then travels to pass through the annular aperture 5. The annular aperture 5 is a partial beam interceptor.

Figure 4:
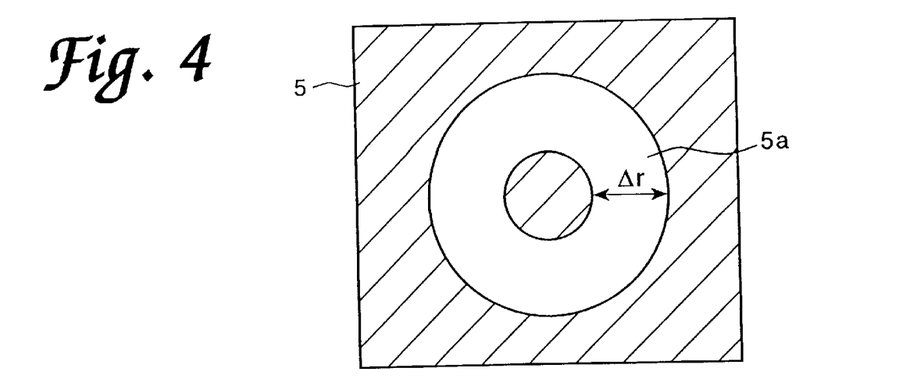
FIG. 4 is a diagram showing a plan view of an annular aperture of the optical recording/reproduction apparatus shown in FIG. 3.

FIG. 4 is a diagram showing a plan view of the annular aperture 5. The aperture 5 has an annular opening 5a. Because of the annular opening 5a, the laser beam that passes through the annular aperture 5 has a cross section of a corresponding hollow annular shape, and then enters the condenser lens 6. Note that the opening 5a of the annular aperture 5 and the objective lens 12 are disposed coaxially to each other along an optical center axis.

Refer again to FIG. 3. After leaving the condenser lens 6, the laser beam passes through the pinhole 8 and then enters the collimator lens 10 for conversion into collimated light rays. The resultant beam of collimated light rays passes through the objective lens 12 toward the hemispherical lens 14. Upon incidence of the beam to the hemispherical lens 14, a fine or micro-profile beam spot is formed on the bottom surface of the hemispherical lens 14. This beam spot then leaves the hemispherical lens 14 via evanescent wave and impinges the surface of the recording medium 20, thus recording information on a photosensitive recording layer thereof. Such recording is well known to one skilled in the art.

In one embodiment of the present invention, the hemispherical lens 14 is configured so that it faces the recording medium 20 with a predefined constant space or "gap" therebetween by utilizing a conventional air bearing slider, or with no space or "gap" therebetween (that is, in contact).

Additionally, the reference character "$\theta_m$" in FIG. 3 refers to a maximam angle of incidence of the laser beam, inside the hemispherical lens while "$\theta_c$" represents the critical angle inside the hemispherical lens 14.

In one embodiment of the present invention, the pinhole 8 is disposed between the condenser lens 6 and the collimator lens 10, in a manner that it is spaced by the focal distance $f_1$ from the lens 6 and focal distance $f_2$ from the lens 10. Therefore, these lenses 6, 10 are separated by the distance $f_1+f_2$.

The evanescent wave generating lens 14 and the recording medium 20 are disposed adjacent to each other in a way such that the distance therebetween is less than one-third (⅓) of the wavelength of the laser beam used. For example, when the light source 2 is a blue semiconductor laser with a wavelength of 400 nanometers (nm), the distance between the hemispherical lens 14 and the recording medium 20 is preferably set to be less than or equal to 120 nm.

In the illustrative optical recording/reproducing device thus arranged, the ring size $\Delta r'$ of a laser beam reaching the objective lens 12 (see FIG. 3) may be defined by:

$$\Delta r' = \Delta r \cdot f_2 / f_1$$

where $\Delta r$ is the ring width of a laser beam as formed by the annular aperture 5, $f_1$ is the focal distance of the condenser lens 6, and $f_2$ is the focal distance of the collimator lens 10.

In the illustrative embodiment of the present invention, the ring size $\Delta r$ of the annular aperture 5 is designed to ensure selective introduction or incidence of only those light rays with incident angles approximately greater than or equal to the critical angle $\theta_c$ of the evanescent wave generating lens 14. This enable blocking of most rays of light which do not generate evanescent wave that otherwise would pass through the objective lens 12 to reach the evanescent wave generating lens 14. According to the principles of the present invention, any desired effects and advantages may be attainable by a hollow annular diaphragm for blocking or intercepting those rays at or near the optical axis of a laser beam used.

With such an arrangement employing a scheme of transmitting only a limited part of laser beam having incident angles larger than or equal to the critical angle $\theta_c$ of the hemispherical lens 14, the following advantages are obtainable as set forth below.

Figure 5:
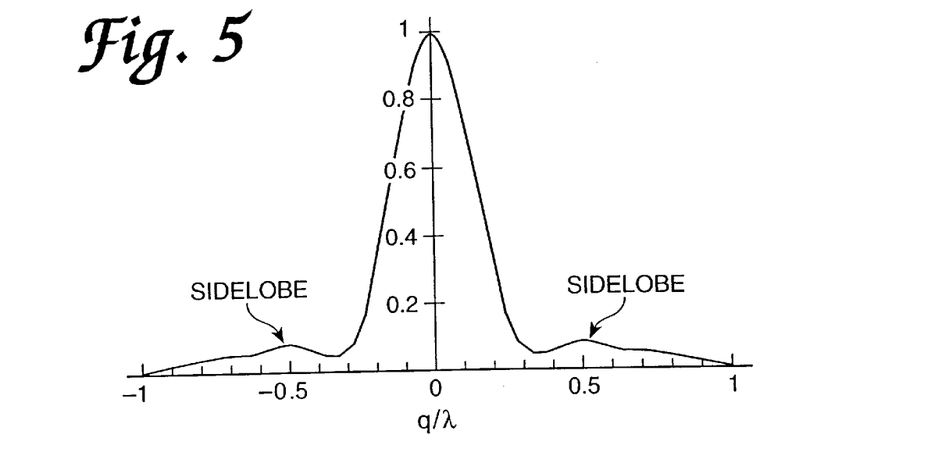
FIG. 5 is a graph showing a normalized intensity distribution of a light spot in the optical recording/reproducing apparatus of FIG. 3.

FIG. 5 is a graph showing a normalized intensity distribution of a light spot in the optical recording/reproduction apparatus of FIG. 3. As in the prior case shown in FIG. 2, suppose that the hemispherical lens 14 and the recording medium 20 are set at approximately 1.88 in refractive index, a thin space or "gap" distance between the lens 14 and the medium 20 is set at about 0.3 times the wavelength, and the laser beam, and the incident angle of "marginal" light rays within hemispherical lens 14 is set at 57.6°. When the annular aperture 5 is disposed into the optical path for measurement of a normalized intensity distribution or profile of a laser spot, the resulting curve is as shown in the graph of FIG. 5. Again, the horizontal axis of the graph represents positions ($q/\lambda$) as measured along the radial direction inside the surface of the recording medium 103.

It is evident from a comparison of the graph of FIG. 5 with the graph of FIG. 2 that in the latter case, the central peak is accompanied with two peaks called the "sidelobes" on its opposite sides. In contrast, the FIG. 5 profile which shows the effect of the annular aperture 5 shows that these sidelobes are drastically reduced.

Generally, in an optical system design, light interception schemes of selectively permitting only limited rays of light near the periphery of a lens by blocking the remaining rays near the center of such lens are well-known. These schemes have been collectively called the "apodization" among persons skilled in the art. It is known that use of this method can narrow the center peak in exchange for the bigger sidelobes.

The scheme of the present invention is principally different from the generally known apodization aperture method. More specifically, one important principle of the present invention lies in the capability to reduce sidelobe by using a specific diaphragm mechanism including the annular aperture 5 to effectively block or cut off only selected rays of incident laser beam which have angles of incidence less than the critical angle $\theta_c$. This significantly improves the optical resolution of the recording/reproducing device. Furthermore, the effect of the present invention are not achievable by use of any other currently available evanescent wave generating lenses.

For more detailed discussions on this matter, consider certain light collected by the evanescent wave generating lens at the incident angle greater than or equal to the critical angle $\theta_c$, that is, a laser beam of ring-like annular cross-section being irradiated from a location spaced apart from the optical axis. Such light will be referred to here as "outer light," whereas light rays at or near the optical axis will be referred to here as "inner light."

Figure 6:
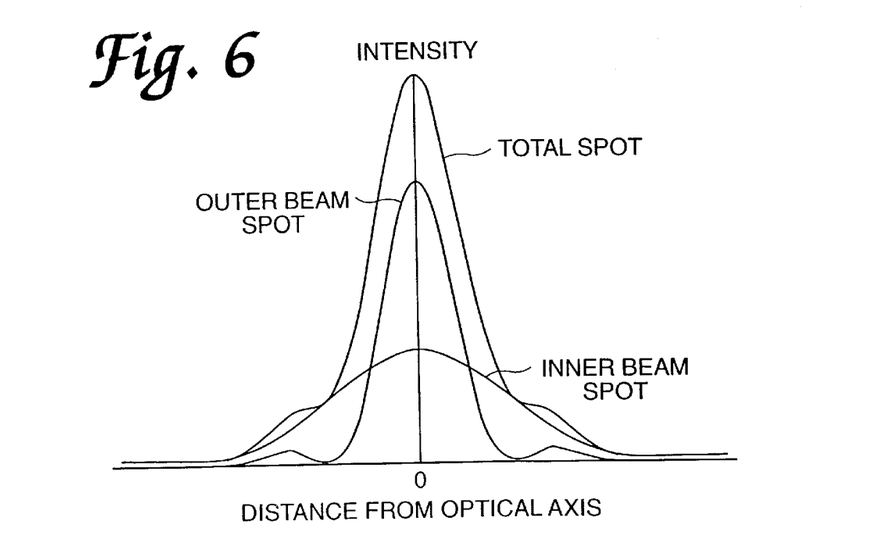
FIG. 6 is a graph showing spot intensity distribution characteristics obtainable when "outer" light rays of a beam reaching a recording medium are greater in intensity than "inner" light rays.
Figure 7:
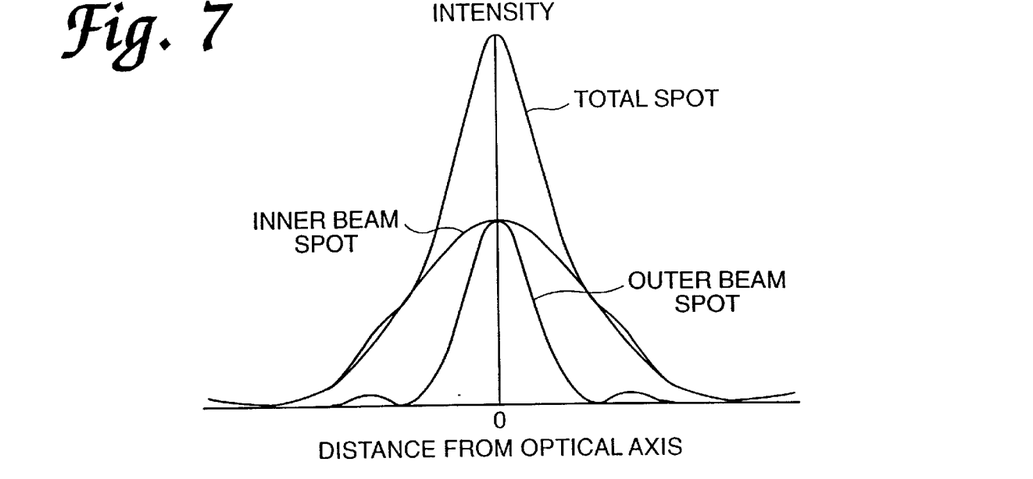
FIG. 7 is a graph showing spot intensity distribution characteristics obtainable when the outer light rays reaching the recording medium are identical in intensity to the inner rays.
Figure 8:
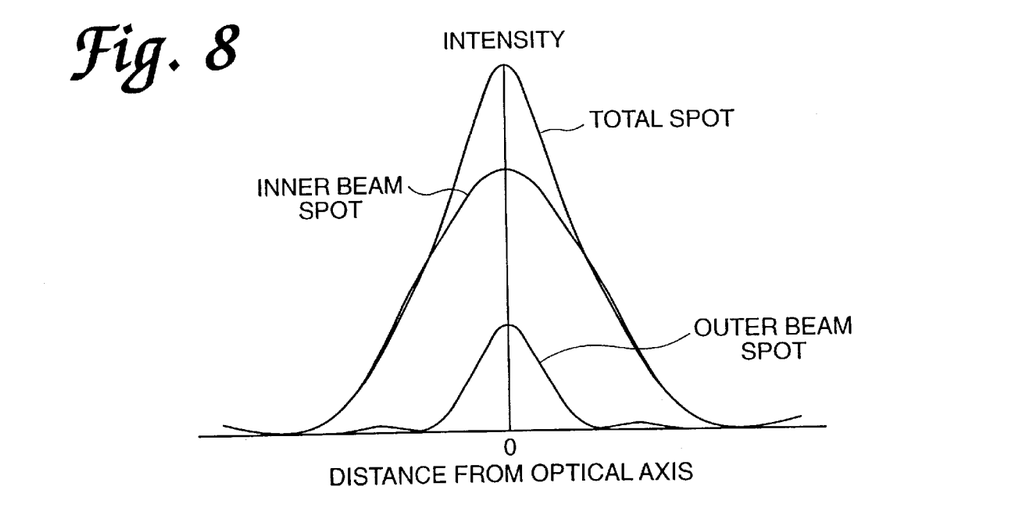
FIG. 8 is a graph showing spot intensity distribution characteristics obtainable when the outer light rays reaching the recording medium are less in intensity than the inner rays.

Refer to several graphs shown in FIGS. 6–8.

FIG. 6 is a graph showing spot intensity distribution characteristics obtainable when the outer light of a laser beam reaching a recording medium is greater in intensity than the inner light. FIG. 7 is a graph showing spot intensity distribution characteristics when the outer light reaching the recording medium is identical in intensity to the inner light. FIG. 8 is a graph showing spot intensity distribution characteristics when the outer light reaching the medium is less in intensity than the inner light.

To minimize the affect of the inner light has on the intensity distribution profile of a spot of light formed on the recording medium, it is necessary to minimize the transmittance of inner light while maximizing the transmittance of outer light, as shown in FIG. 6. Major factors that can affect the transmittance may include, but are not exclusively limited to, the numerical aperture (NA) of an objective lens, the shape and refractive index of an evanescent wave generating lens, the distance between the evanescent wave generating lens and a recording medium used, and the refractive index of a surface film of such medium.

Again, the present invention is capable of improving the device's optical resolution irrespective of critical angle of the evanescent wave generating lens. This capability is achievable by simply providing a hollow annular diaphragm structure for blocking or interception of a selected part of a laser beam at or near the optical axis thereof.

In this way, the optical recording/reproducing device incorporating the principles of the present invention may easily attain, when compared to the prior art, improvement in its optical resolution by use of a specific configuration for preventing those light rays that do not contribute to generation of the evanescent wave from reaching the hemispherical lens 14.

Another advantage of the invention is that it can be realized by simply adding an annular aperture 5 along the optical path of the recording/reproducing device. This allows the cost of the device to not increase by much, if at all, from the introduction of the invention.

Figure 9:
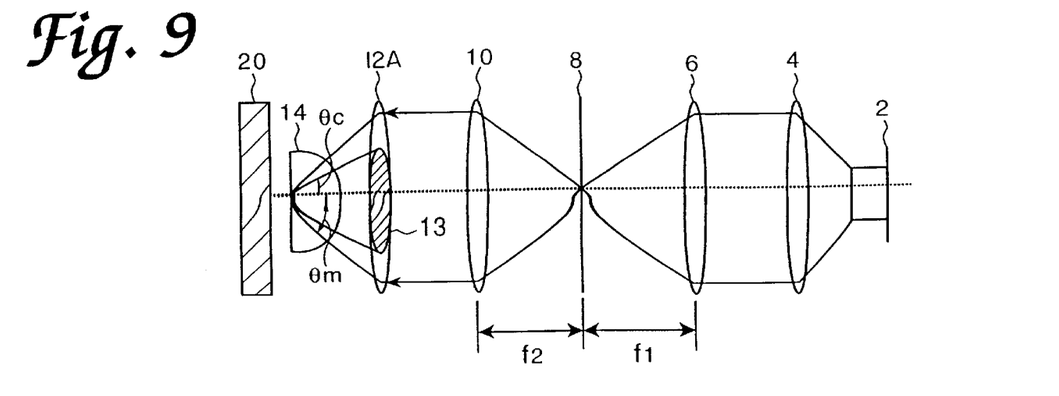
FIG. 9 is a cross-sectional view showing an overall configuration of an optical recording/reproduction apparatus in accordance with another embodiment of the present invention.
Figure 10:
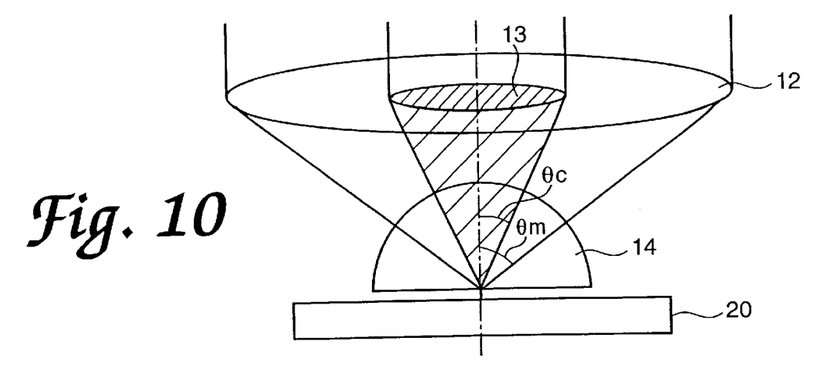
FIG. 10 schematically illustrates a configuration of an optical system constituting part of the apparatus of FIG. 9.
Figure 11:
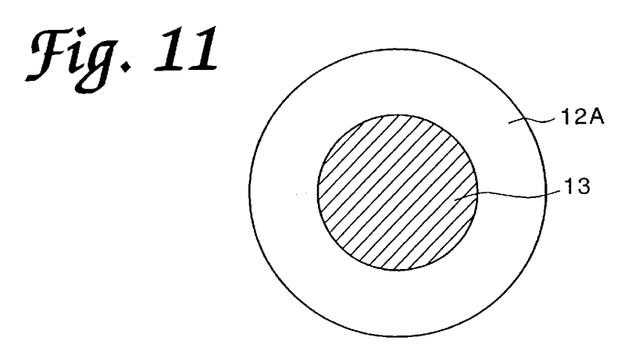
FIG. 11 illustrates a plan view of an objective lens of the apparatus of FIG. 9.

FIG. 9 is a cross-sectional view illustrating an optical recording/reproducing device in accordance with another embodiment of the present invention. FIG. 10 is a schematic diagram of a portion of the apparatus of FIG. 9. FIG. 11 is a plan view of an objective lens with a planar structure of the apparatus of FIG. 9. Note that like parts or components are designated by like reference characters as used in FIG. 3.

The configuration of the optical recording/reproducing device shown in FIG. 9 is generally similar to that of FIG. 3 with the objective lens 12 of FIG. 3 being replaced by an objective lens 12A with diaphragm 13. The diaphragm 13 is illustratively disposed or "embedded" in the objective lens 12A, and placed concentrically relative to the optical axis of the objective lens 12A.

The diaphragm 13 may be any one of currently available opaque members that block or cut off rays of incoming light. One example is that a material of a selected color with high optical absorptance, typically black, coated or deposited on the surface of the objective lens 12A thus forming the diaphragm 13.

Such directly providing the diaphragm 13 on the objective lens 12A, light emitted from the source 2 may be partially blocked or intercepted. This makes it possible for only limited rays of light hitting the outer periphery of the diaphragm 13 to pass through the inside of the objective lens 12A and enter the hemispherical lens 14.

Preferably, the diaphragm 13 is shaped to have a specific bore diameter that causes the hemispherical lens 14 to receive only those rays of light with incident angles greater than or equal to the critical angle $\theta_c$. Note, however, that the foregoing advantages of the present invention remain achievable when the diaphragm 13 has a shape capable of shaping a laser beam into hollow annular cross section without requiring excessive size design accuracy.

FIGS. 12 through 16 are schematic diagrams illustrating optical apparatuses according to other embodiments of the present invention.

Figure 12:
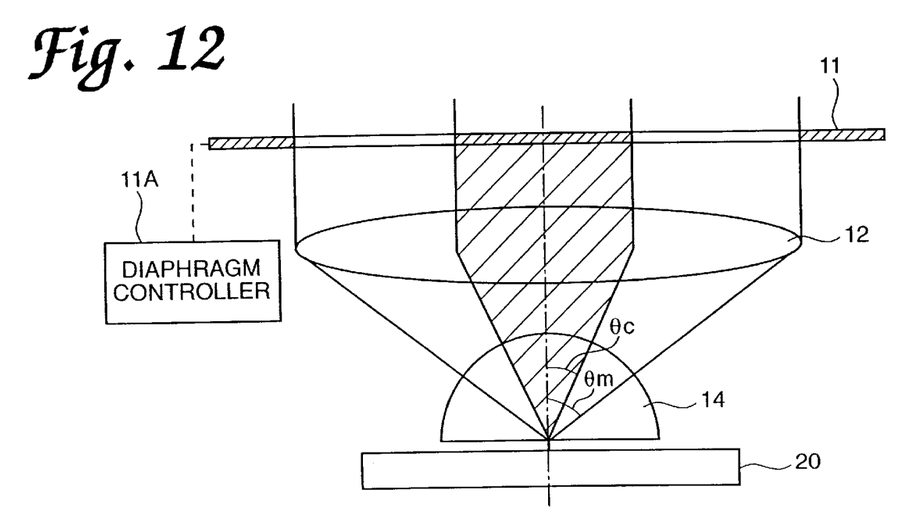
FIGS. 12 through 16 are schematic depictions of optical systems in accordance with further embodiments of the present invention.

FIG. 12 shows a schematic diagram of optical system for the optical recording/reproducing device in accordance with a third embodiment of the invention An overall configuration of this embodiment may be generally similar to that shown in FIG. 3, and is omitted from the illustration.

A feature of this embodiment of the present invention is that a diaphragm member 11 is provided as an optical component in front of the objective lens 12, i.e., in between the light source 2 (see FIG. 3) and the objective lens 12.

The diaphragm 11 is arranged to block or intercept selected rays of laser beam incident onto the objective lens 12 which are at or near the optical axis in a way similar to that of the annular aperture 5 shown in FIG. 3. The diaphragm 11 may be, for example, a liquid crystal shutter that is responsive to a control signal supplied from an associated diaphragm controller 11A for opening and closing the aperture (e.g., shutter ON/OFF) and/or, alternatively, controlling the shutter area by changing an input voltage so that the area is variable continuously.

Also in this embodiment of the present invention, blocking only part of a light beam incident on the objective lens 12 may prevent those rays with no contribution to generation of the evanescent wave from reaching the hemispherical lens 14. As in the above described embodiments of the present invention, this result in great suppression or elimination of the sidelobes otherwise occurring on the opposite sides of the central peak in the intensity distribution of a beam spot, which in turn leads to easy enhancement of the optical resolution.

Additionally, the diaphragm member 11 as used in the embodiment of FIG. 12 is made to be detachable from the light path where appropriate, unlike the embodiments of FIGS. 9–10 with the diaphragm 13 being directly formed on the lens such as the hemispherical lens 14 or the objective lens 12.

It is noted that when using the liquid crystal shutter as shown in FIG. 12, it is also possible to alter the shutter area in response to an electrical signal from the diaphragm controller 11A. This makes it possible to permit the diaphragm 11 to vary in size appropriately in a manner similar to an iris. Thus, it becomes possible to readily correct or compensate for deviations in a characteristic of the individual optical component otherwise occurring in mass production of optical recording/reproducing devices incorporating the principles of the present invention. Simultaneously, adequate fine or precise adjustments of such "iris" diaphragm's shutter area may also be attainable in conformity with the type of recording medium 20 used.

It is also noted that the diaphragm 11 of FIG. 12 may alternatively be disposed at the post stage of the associative objective lens 12, rather than in front thereof.

Figure 13:
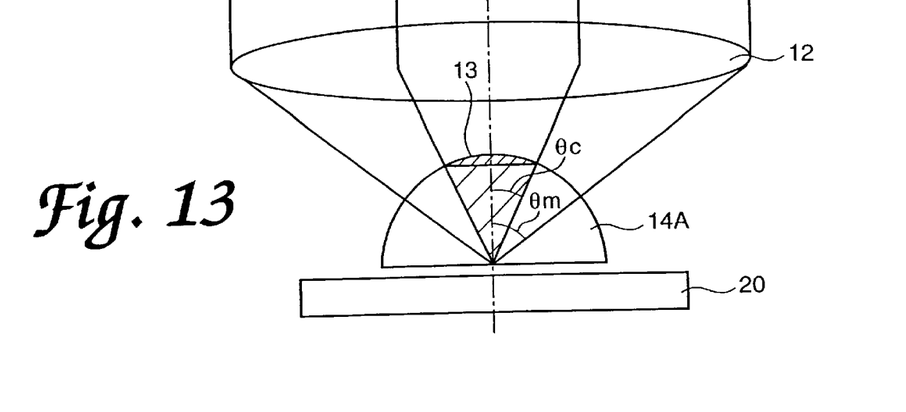

Refer now to FIG. 13, which shows an optical recording/reproducing device including an optical system in accordance with yet another embodiment of the present invention.

In this embodiment of the present invention, a diaphragm 13 is disposed at a hemispherical lens 14A such that the diaphragm 13 is either on the surface of the hemispherical lens 14A or in the interior thereof. The diaphragm 13 is positioned concentrically relative to the optical axis of the hemispherical lens 14A.

Note that the diaphragm 13 is designed to have a "bore" diameter that allows only those rays with incident angles greater than or equal to the critical angle $\theta_c$ to enter the hemispherical lens 14A as input light. Again, the advantage of the present invention is provided whenever the diaphragm 13 reshapes a laser beam into hollow annular cross sections.

In this embodiment also, the optical resolution may be easily increased as compared to prior art devices because it is possible to prevent, or at least greatly suppress, those rays of laser beam which do not contribute to generation of the evanescent wave from transmitting through the hemispherical lens 14A.

Figure 14:
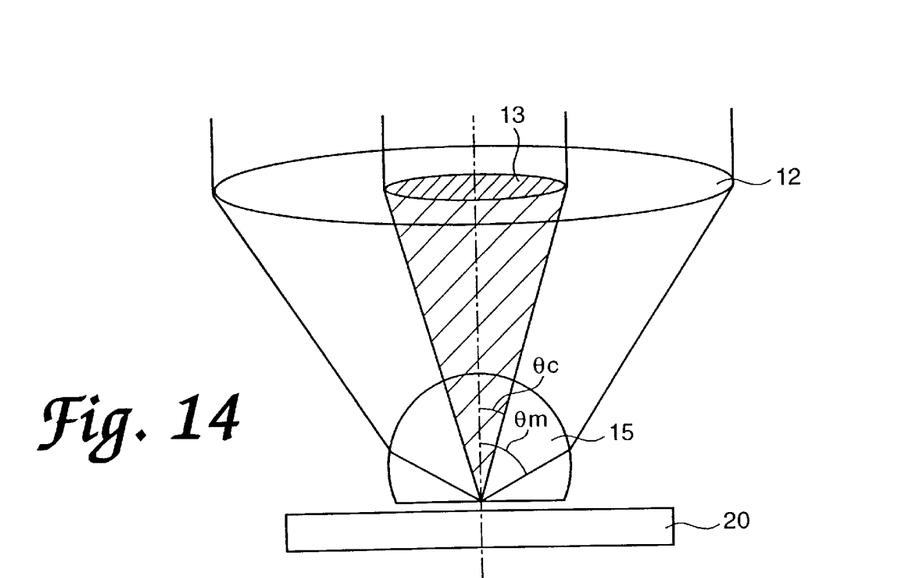

Refer now to FIG. 14, which shows an optical system adaptable for use in an optical read/write device in accordance with a further embodiment of the present invention.

In this embodiment of the present invention, the evanescent wave generating lens is structured from a "fat" spherical lens 15 that has a horseshoe arch-like cross section and much resembles a sphere in profile as shown in FIG. 14 (hereinafter, simply referred to as the "spherical lens"). The spherical lens 15 has an approximate thickness $r(1+1/n)$ where r is the radius of curvature of the spherical surface of the lens, and n is the refractive index of the lens. All rays pointed toward a point approximately nr below the center of the spherical surface undergo refraction at the spherical surface and will be focused at the center of the bottom surface of the lens.

The rays refracted at the spherical surface of the spherical lens 15 have large angle of incidence. In turn, this enables design of the intended optical system by use of a desired objective lens with smaller NA value.

The decrease in NA of the objective lens 12 lessens the amount of wavefront aberration caused by the objective lens 12 varying in location relative to the recording medium 20 as the lens 12 is offset in position along its optical axis due to application of physical vibrations, for example.

Figure 15:
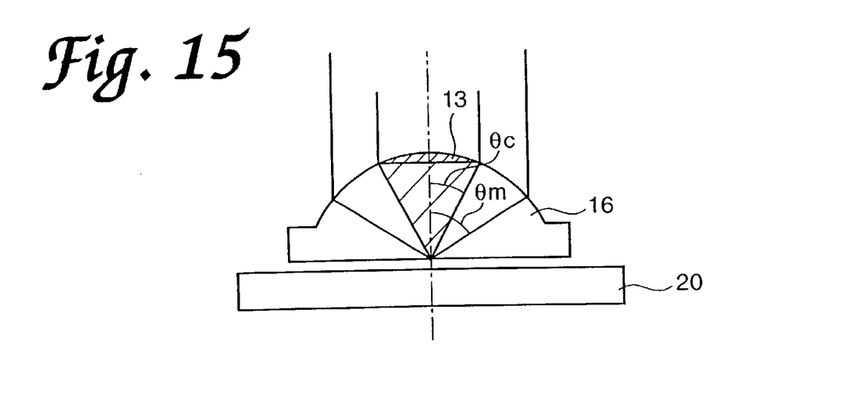

Refer now to FIG. 15 which shows an optical system for use in an optical read/write device in accordance with a further embodiment of the present invention.

The optical system shown employs an aspherical lens 16 which has function of objective lens and evanescent wave generating lens combined. The aspherical lens 16 has in or on its surface a diaphragm 13 centrally disposed for permitting only selected rays of an incident laser beam with incident angles greater than or equal to critical angle $\theta_c$ to pass through.

Provision of such diaphragm 13 may prevent those rays of light which do not significantly contribute to generation of the evanescent wave from transmitting through the aspherical lens 16. With such an arrangement, less or no sidelobes are present in the light spot intensity distribution curve as in the embodiments mentioned earlier, which in turn greatly enhances or maximizes the optical resolution of the recording/reproducing device with no specific difficulties.

It also becomes possible to reduce the complexity of the optical system configuration while reducing production costs because of a decrease in the number of optical elements when compared to respective embodiments discussed previously.

The foregoing illustrative embodiments are directed in principle to the scheme for adjusting the intensity distribution of incident light rays to the evanescent wave generating lens by use of the diaphragm or the like as provided in a variety of forms. The present invention also provides another approach to size reduction of a laser beam spot by optimizing the refractive index of a surface film of the recording layer of a recording medium used (or the recording medium per se when no such film is present). This is described in more detail below.

Figure 16:
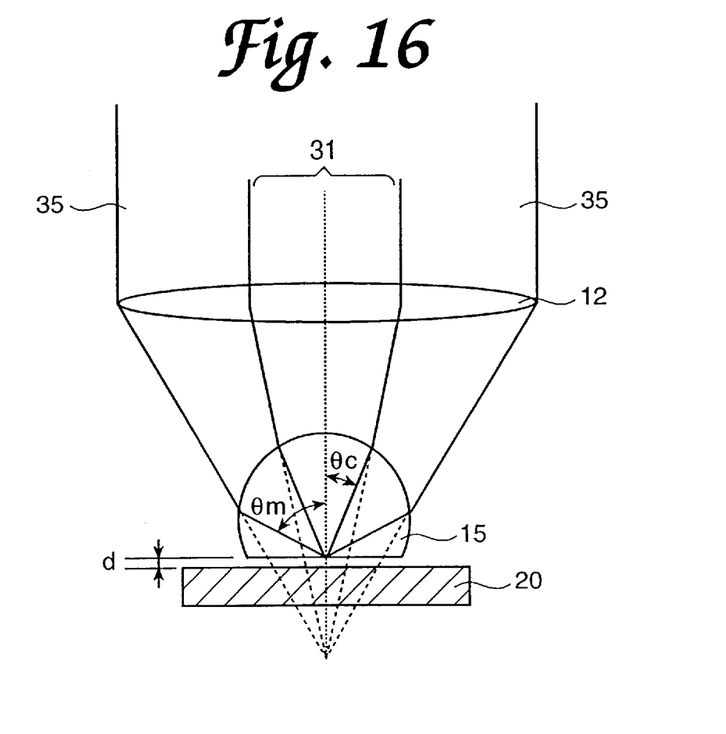
Figure 17:
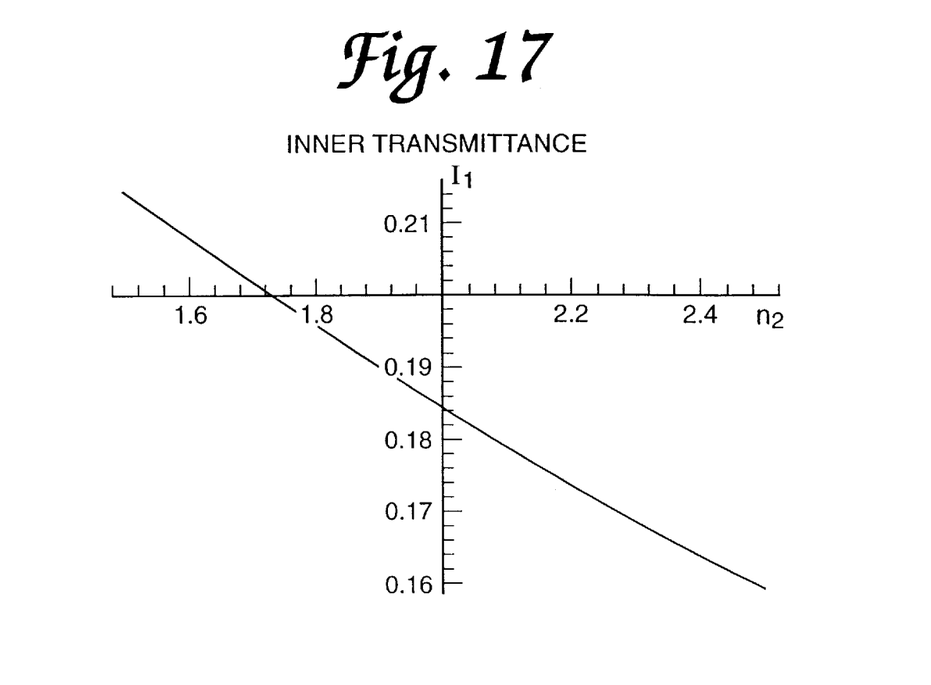
FIG. 17 is a graph showing a relation of the refractive index of a surface film of a chosen recording medium versus the inner transmittance through the air gap for the embodiment of FIG. 16.
Figure 18:
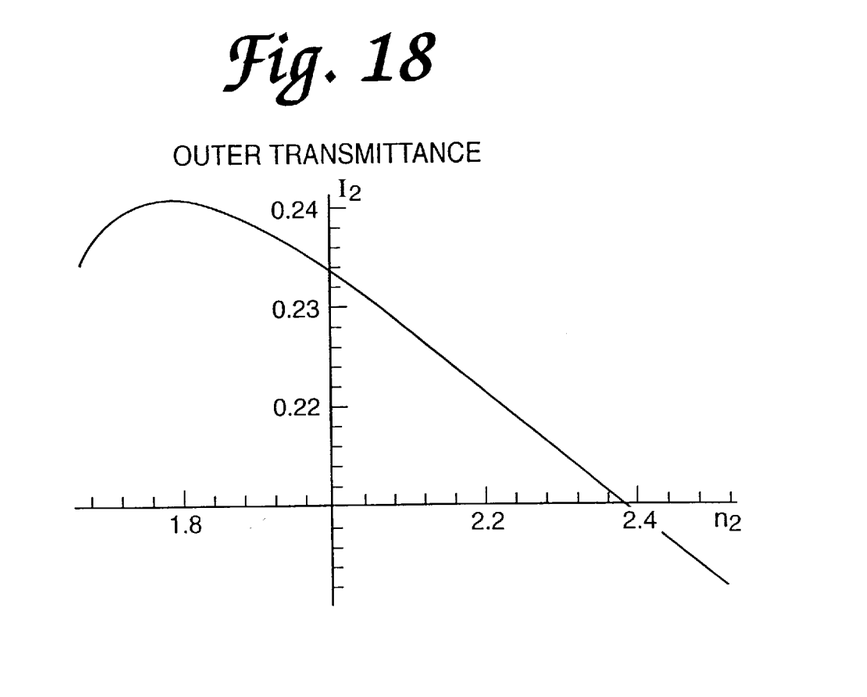
FIG. 18 is a graph showing a relation of a surface film of a recording medium versus the outer transmittance through the air gap used for the embodiment of FIG. 16.
Figure 19:
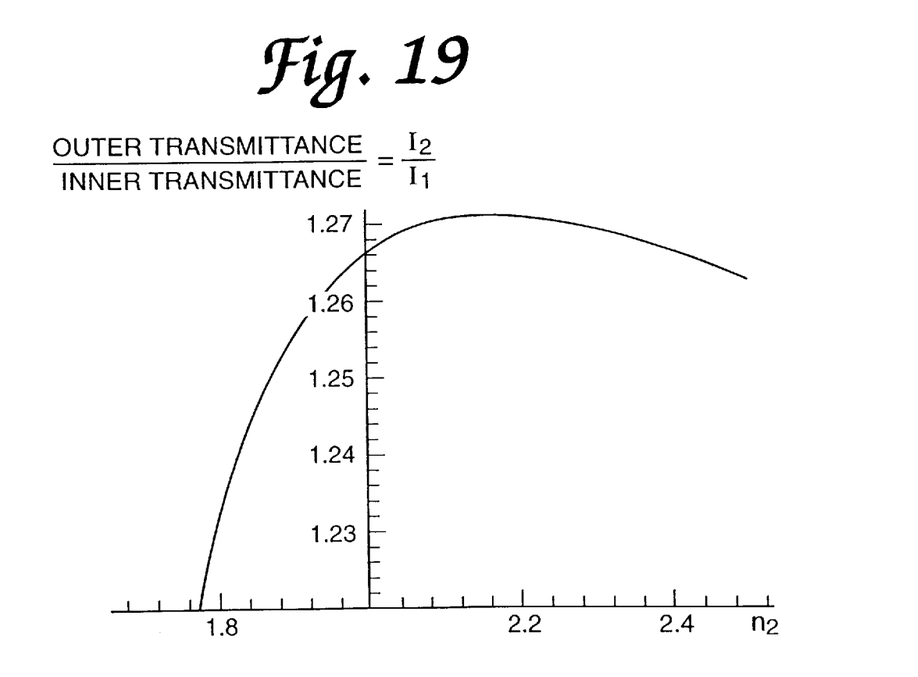
FIG. 19 is a graph showing a relation of a surface film of a recording medium versus the outer transmittance divided by the inner transmittance through the air gap used for the embodiment of FIG. 16.

Refer now to FIG. 16, which shows an optical system for use in an optical recording/reproducing device in accordance with a further embodiment of the present invention, which incorporates the "surface-film refractive index optimization" concept described above. The graphs of FIGS. 17 through 19 shows relations between some typical surface-film refractive index and transmittance through the air gap. The remaining part (not shown) of an overall configuration of the FIG. 16 embodiment is similar to those depicted in FIGS. 3 and 9.

The symbol $I_1$ designates the transmittance (internal transmittance) of a laser beam 31 through the air gap, which light involves those rays with angles of incidence less than or equal to the critical angle $\theta_c$ inside the spherical lens 15. The symbol $I_2$ denotes the transmittance (external transmittance) of a laser beam 35 through the air gap, which light contains rays with angles of incidence greater than or equal to the critical angle $\theta_c$ inside the spherical lens 15. The internal transmittance $I_1$ and external transmittance $I_2$ may be represented approximately by the following equations:

$$I_1 = 2\frac{n_0^2 - \sin^2\theta_m}{\sin^2\theta_m} \int_0^{\theta_c} \frac{\cos\theta_0 \sin\theta_0}{n_0^2\left(1 - \frac{\sin^2\theta_0}{n_0^2}\right)^2} T_{in} d\theta_0$$

$$I_2 = 2\frac{n_0^2 - \sin^2\theta_m}{\sin^2\theta_m} \int_{\theta_c}^{\theta_m} \frac{\cos\theta_0 \sin\theta_0}{n_0^2\left(1 - \frac{\sin^2\theta_0}{n_0^2}\right)^2} T_{out} d\theta_0$$

Here, $$T_{in} = 4\zeta\left[(1+\zeta)^2\cos^2 G_1 + \left(\frac{\zeta n_0 \cos\theta_0}{B} + \frac{B}{n_0 \cos\theta_0}\right)^2 \sin^2 G_1\right]^{-1}$$

$$T_{out} = 4\zeta\left[(1+\zeta)^2\cosh^2 g_1 + \left(\frac{\zeta n_0 \cos\theta_0}{\beta} - \frac{\beta}{n_0 \cos\theta_0}\right)^2 \sinh^2 g_1\right]^{-1}$$

-continued $$\zeta = \frac{\sqrt{n_2^2 - n_0^2\sin^2\theta_0}}{n_0 \cos\theta_0}, \quad B = \sqrt{1 - n_0^2\sin^2\theta_0},$$

$$G_1 = 2\pi B\left(\frac{d}{\lambda_1}\right), \quad \beta = \sqrt{n_0^2\sin^2\theta_0 - 1}, \quad g_1 = 2\pi\beta\left(\frac{d}{\lambda_1}\right)$$

where $n_0$ is the index of refraction of the spherical lens 15, $n_2$ is the index of refraction of a surface film of the recording medium 20 (or alternatively, the medium per se in cases where no such film is provided), $\theta_c$ is the critical angle of laser beam inside the spherical lens 15, $\theta_m$ is the maximum angle of laser beam inside spherical lens 15, d is the distance between the bottom surface of the lens 14 and the surface of the medium 20, and $\lambda_1$ is the laser wavelength in the air.

Given that $n_0=1.83$ (hence, $\theta_c$ is about 33.1°), $\theta_m=66.2°$, d=150 nm, $\lambda 1=830$ nm, then the relations shown in FIGS. 17–19 are obtainable.

FIG. 17 is a graph showing a relation between $I_1$ and $n_2$.
FIG. 18 is a graph showing a relation between $I_2$ and $n_2$.
FIG. 19 is a graph showing a relation between $I_2/I_1$ and $n_2$.

In this case, a light spot being formed on the surface of the recording medium 20, by setting $n_2$ to be greater in value than a value of refractive index where $I_2$ is maximal (approximately 1.8) (see FIG. 18), and less than a refractive index where the ratio of outer transmittance $I_2$ to inner transmittance $I_1$($I_2/I_1$) is maximal (approx. 2.17).

Figure 20:
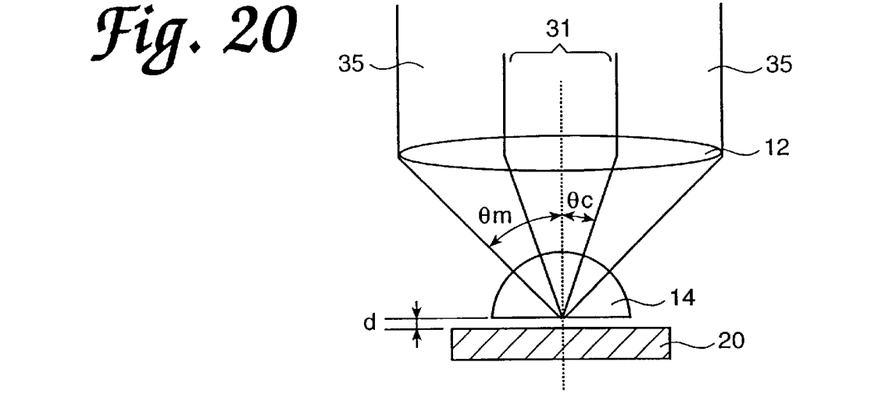
FIG. 20 is a cross-sectional view showing an optical system, in accordance with another embodiment of the present invention.
Figure 21:
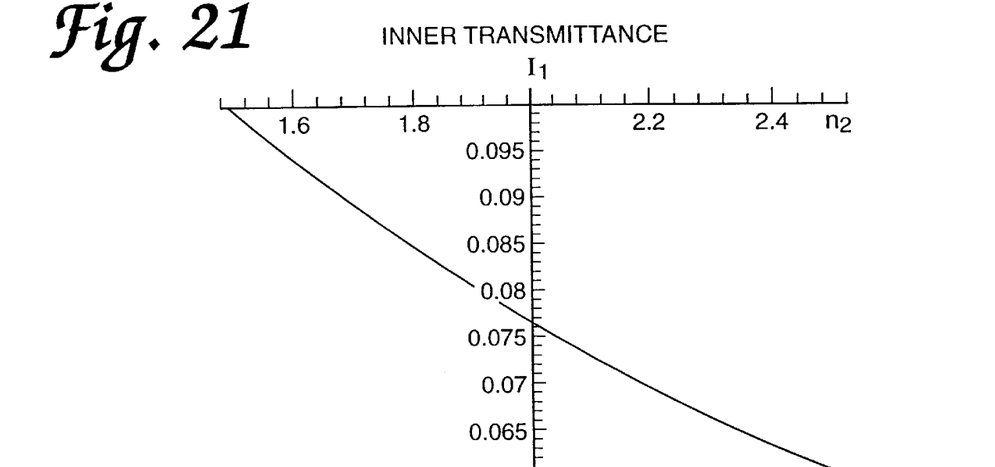
FIG. 21 is a graph showing a relation of the refractive index of a surface film of a chosen recording medium versus inner transmittance through the air gap used for the embodiment of FIG. 20.
Figure 22:
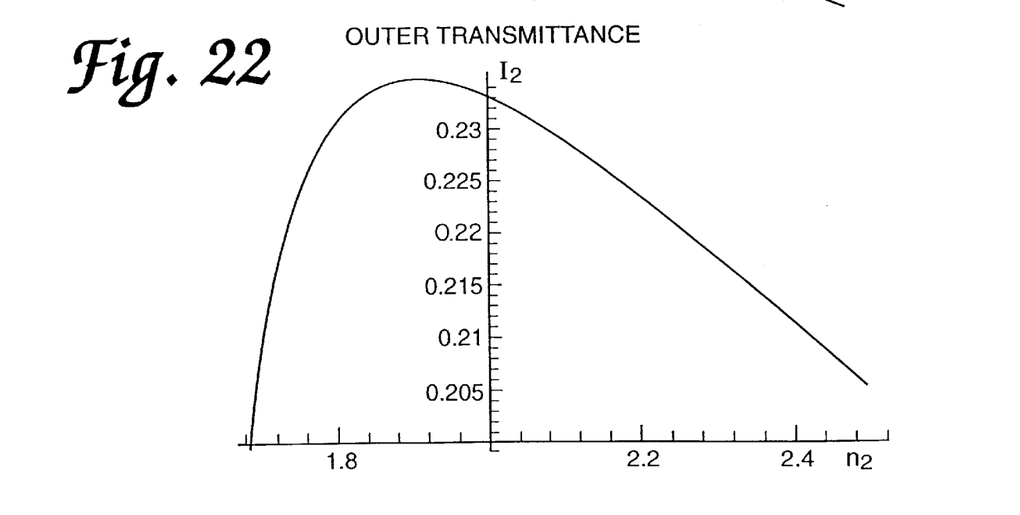
FIG. 22 is a graph showing a relation of a surface film of a recording medium versus outer transmittance through the air gap used for the embodiment of FIG. 20.
Figure 23:
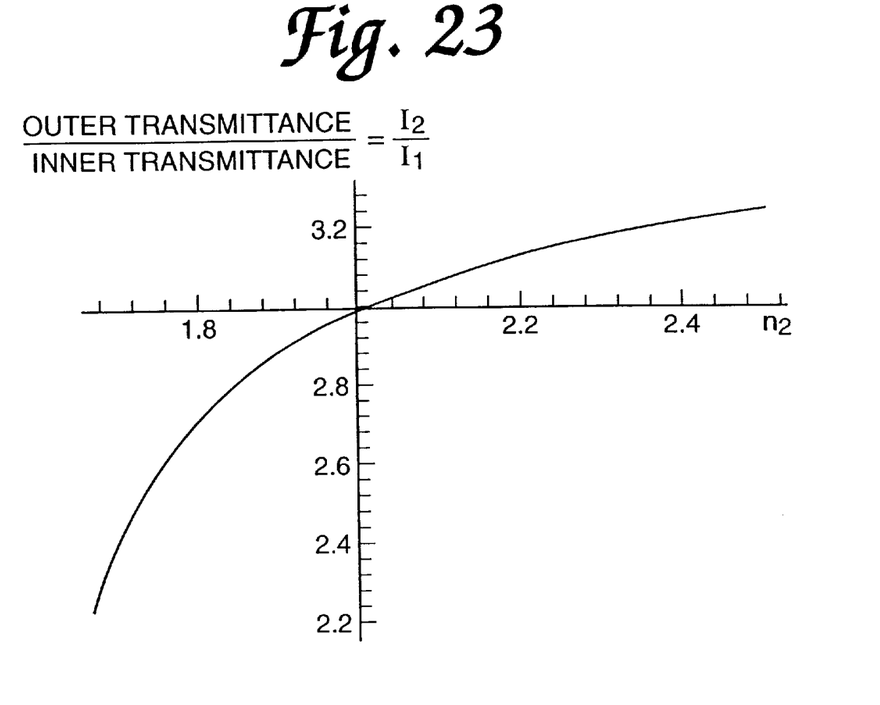
FIG. 23 is a graph showing a relation of a surface film of a recording medium versus the outer transmittance divided by the inner transmittance through the air gap used for the embodiment of FIG. 20.

FIG. 20 is a cross-sectional view showing a lens system of an optical read/write device in accordance with another embodiment of the present invention. The graphs of FIGS. 21 through 23 shows relations between refractive index and transmittance through the air gap. The remaining part of the FIG. 16 embodiment may be the same in configuration as those depicted in FIGS. 3 and 9.

The embodiment of FIG. 20 is different from the FIG. 16 embodiment in that the spherical lens 15 is replaced with a hemispherical lens 14.

In the FIG. 20 embodiment also, the symbol $I_1$ designates the transmittance (internal transmittance) of a laser beam 31 through the air gap, which light involves those rays with angles of incidence less than or equal to the critical angle $\theta_c$ inside the hemispherical lens 14. The symbol $I_2$ indicates the transmittance (outer transmittance) of the laser beam 35 through the air gap, which light contains rays with angles of incidence greater than or equal to critical angle $\theta_c$ inside the hemispherical lens 14. The inner transmittance $I_1$ and outer transmittance $I_2$ may be given approximately by:

$$I_1 = 2\cot^2\theta_m \int_0^{\theta_c} T_{in}\tan\theta_0 \sec^2\theta_0 d\theta_0$$

$$I_2 = 2\cot^2\theta_m \int_{\theta_c}^{\theta_m} T_{out}\tan\theta_0 \sec^2\theta_0 d\theta_0$$

Here, $$T_{in} = 4\zeta\left[(1+\zeta)^2\cos^2 G_1 + \left(\frac{\zeta n_0 \cos\theta_0}{B} + \frac{B}{n_0 \cos\theta_0}\right)^2 \sin^2 G_1\right]^{-1}$$

$$T_{out} = 4\zeta\left[(1+\zeta)^2\cosh^2 g_1 + \left(\frac{\zeta n_0 \cos\theta_0}{\beta} - \frac{\beta}{n_0 \cos\theta_0}\right)^2 \sinh^2 g_1\right]^{-1}$$

$$\zeta = \frac{\sqrt{n_2^2 - n_0^2\sin^2\theta_0}}{n_0 \cos\theta_0}, \quad B = \sqrt{1 - n_0^2\sin^2\theta_0},$$

-continued $$G_1 = 2\pi B\left(\frac{d}{\lambda_1}\right), \quad \beta = \sqrt{n_0^2\sin^2\theta_0 - 1}, \quad g_1 = 2\pi\beta\left(\frac{d}{\lambda_1}\right)$$

where $n_0$ is the index of refraction of the hemispherical lens 14, $n_2$ is the index of refraction of a surface film of the recording medium 20 (or alternatively, the medium per se if no such film is provided), $\theta_c$ is the critical angle of laser beam inside the hemispherical lens 14, $\theta_m$ is the maximum angle of laser beam inside the hemispherical lens 16, d is the distance between the bottom surface of the lens 16 and the surface of the medium 20, and $\lambda_1$ is the laser wavelength in the air.

Given that $n_0$=1.83 ($\theta_c$ is about 33.1°), $\theta_m$=66.2°, d=150 nm, $\lambda_1$=830 nm, the relations shown in FIGS. 21–23 may be obtained.

FIG. 21 is a graph showing a relation between $I_1$ and $n_2$.
FIG. 22 is a graph showing a relation between $I_2$ and $n_2$.
FIG. 23 is a graph showing a relation between $I_2/I_1$ and $n_2$.

In this case, a beam spot being formed on the surface of the recording medium 20 may be minimized by setting $n_2$ to be greater in value than a value of refractive index, where the $I_2$ is maximum (approx. 1.93) (see FIG. 22), and less than a refractive index where the ratio $I_2/I_1$ is maximum (infinite in value) (see FIG. 23), that is 1.93 or above.

Figure 24:
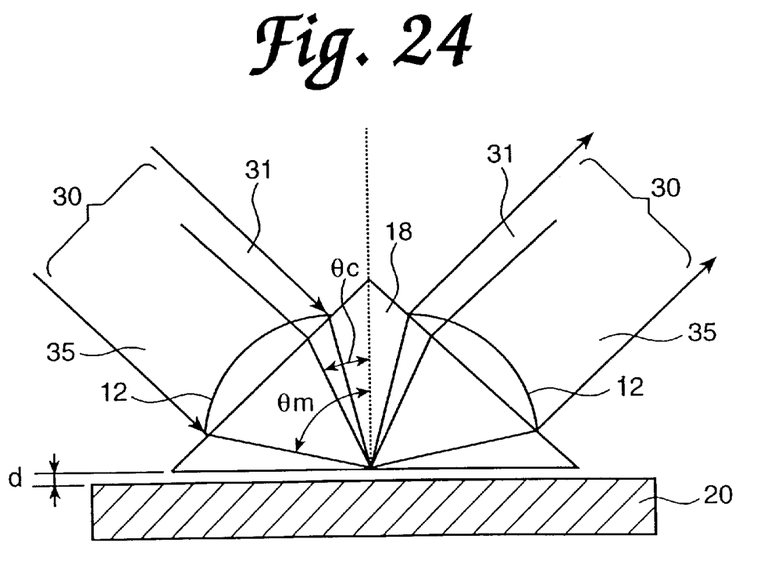
FIGS. 24–25 are cross-sectional views illustrating optical systems in accordance with further embodiments of the present invention.

FIG. 24 is a cross-sectional view illustrating a lens system for use in an optical recording/reproducing device in accordance with another embodiment of the present invention.

The device includes a prism 18 provided between a pair of objective lenses 12 and, a recording medium 20 for utilizing of an evanescent wave generated at the bottom of the prism 18. More specifically, the coupled two objective lenses 12 and the prism 18 function as an evanescent wave generating lens. One objective lens focuses an incident collimated beam on the bottom of the prism, and the other objective lens collimates the beam reflected off the bottom of the prism and/or the recording medium.

In the embodiment of FIG. 24, all or most of the rays of an incoming laser beam 30 are to be collected or gathered at angles of incidence greater than or equal to the critical angle $\theta_c$. Accordingly, if the bottom surface of the prism 18 is placed near the surface of the recording medium 20 (the distance or "gap" in between is about one-third the wavelength of a laser beam, or less) while the refractive index of a surface film of the medium 20 (or medium by itself if such film is absent) is set at a standard value (typically 1.5 to 2.5). Then the ratio of the transmittance $I_2$ (transmittance of those rays of the laser beam 35 attempting to enter the prism 18 at angles of incidence greater than or equal to the critical angle $\theta_c$) to transmittance $I_1$ (transmittance of the remaining rays of laser beam 35 reaching the prism 8 at entry angles less than or equal to the critical angle $\theta_c$) is large in value regardless of refractive index of the surface film of the medium 20 (or medium per se if such film is absent). Of course, no extra components including a diaphragm or equivalents are required.

Thus, with appropriate refractive index value-setting in conformity with miniaturization or "down-sizing" of a laser spot being defined on the recording medium 20, it becomes possible for the laser beam 35, which hits the medium 20 via the evanescent wave, to increase in value of transmittance.

Figure 25:
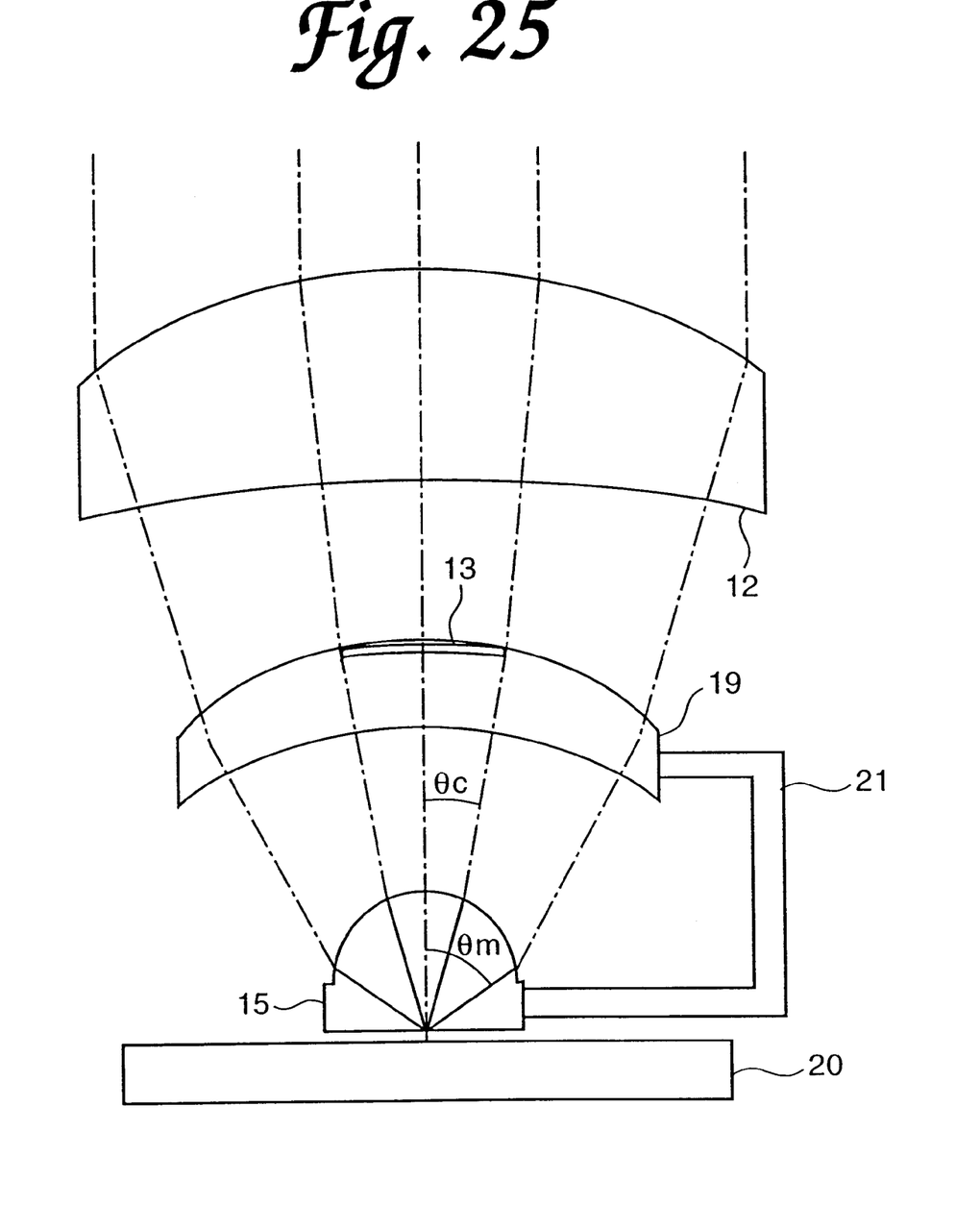

FIG. 25 is a cross-sectional view illustrating an optical system for an optical read/write device in accordance with yet another embodiment of the present invention.

The embodiment shown is configured so that a meniscus lens 19 is disposed between the objective lens 12 and the spherical lens 15 for permitting both the objective lens 12 and the meniscus lens 19 to collect rays of an incoming laser beam while letting the spherical lens 15 to generate evanescent wave. A diaphragm 13 is centrally provided on the surface of the meniscus lens 19 for blocking selected rays of the incoming laser beam which are at or near the optical axis of the meniscus lens 19. The diaphragm 13 may alternatively be embedded in the meniscus lens 19 at a corresponding location.

Importantly, the objective lens 12, the spherical lens 15 and the meniscus lens 19 are specifically disposed in such a way as to satisfy the aplanatic condition in order to minimize optical aberration.

Here we let $\theta_1$ equal to an angle of incidence of marginal ray immediately after leaving the objective lens 12, $\theta_2$ equal to an angle of incidence of marginal ray immadiately after leaving the meniscus lens 19, $\theta_3$ equal to an angle of incidence of marginal ray inside the spherical lens 15, $n_1$ equal to refractive index of the meniscus lens 19, and $n_2$ equal to refractive index of the spherical lens 15. Then, the entry angle $\theta_3$ satisfies the equation:

$$\sin\theta_3 = n_2 \times \sin\theta_2 = n_2 \times n_1 \times \sin\theta_1$$

The above equation shows that the numerical aperture (NA) of incident light reaching the spherical lens 15 through the meniscus lens 19 is $n_1$ times greater than the numerical aperture value NA' (=$\sin\theta_1$) when the meniscus lens 19 is absent. In this embodiment of the present invention, the distance between the meniscus lens 19 and the spherical lens 15 is kept constant by the presence of a support member 21 as shown in FIG. 25. Consequently, this may be equivalent to reducing the NA of the object lens 12 without changing or varying the incident angle of marginal ray within the spherical lens 15.

The lower the NA value of the object lens 12, the larger the focal depth. Thus, the spot diameter of the laser beam at the bottom of the spherical lens 15 is rendered hardly variable with a variation of the distance between the objective lens 12 and the spherical lens 15. In other words, providing the meniscus lens 19 reduces the effect of the positional deviations of the objective lens 12 has on the optical resolution of information recording and reproduction.

Although the invention has been particularly shown and described with reference to preferred embodiments thereof, it will be understood by those skilled in the art that the foregoing and other changes in form and details may be made therein without departing from the spirit and scope of the invention.

For example, the diaphragm 13 used in the prescribed embodiments may be modified to employ a variety of types of functionally equivalent members as far as these are made of opaque materials to offer capability of blocking or "intercepting" part of incoming light. One typical example is that a pattern of certain material colored in a selected color with high light absorptance, e.g., black, is coated or deposited on the surface of the objective lens 12 to form the diaphragm 13. Another example is that the surface of the lens is provided a satin finish causing light rays to exhibit irregular reflection, thus achieving the intended diaphragm function.

It is also noted that the present invention also includes an recording/reproducing apparatus for use in manufacturing a master disk of optical disks as used with compact disk read-only memory (CD-ROM) modules. In this case a photoresist may be employable as the recording medium.

What is claimed is:

1. An optical recording/reproducing apparatus for recording/reproducing information onto a recording medium, comprising:

an evanescent wave generating lens disposed between a beam source and the recording medium and in a light path between the beam source and the recording medium, for generating an evanescent wave by transmitting a laser beam from the beam source; and a partial beam intercepter disposed in the light path, for intercepting an axial portion of the laser beam to generate a hollow beam for transmission to the recording medium.

2. An optical recording/reproducing apparatus according to claim 1, wherein the partial beam intercepter intercepts a portion of the laser beam transmitted from the evanescent wave generating lens at an angle smaller than a predetermined angle relative to an axis of the laser beam.

3. An optical recording/reproducing apparatus according to claim 1, further comprising an objective lens disposed between the light source and the evanescent wave generating lens, for concentrating the laser beam on the evanescent wave generating lens.

4. An optical recording/reproducing apparatus according to claim 1, wherein the partial beam intercepter and the evanescent wave generating lens are integrally formed as one unit.

5. An optical recording/reproducing apparatus according to claim 1, wherein the partial beam intercepter and the objective lens are integrally formed as one unit.

6. An optical recording/reproducing apparatus according to claim 1, wherein the partial beam intercepter is formed by a liquid crystal shutter.

7. An optical recording/reproducing apparatus according to claim 6, wherein the partial beam intercepter changes an area of intercepting the laser beam in response to an input voltage signal applied to the liquid crystal shutter.

8. An optical recording/reproducing apparatus according to claim 1, wherein the partial beam intercepter includes a meniscus lens having a diaphragm disposed thereon in an area within a defined radial distance of an optical axis of the meniscus lens.

9. An optical system for transmitting a light beam from a light source to an optical storage medium, comprising:

a partial beam intercepter disposed in a path of the light beam between the light source and the optical storage medium to selectively block a first portion of the light beam and to transmit a second portion of the light beam having an annular transverse cross section; and an evanescent wave generating lens, coaxially disposed along an optical axis of the partial beam intercepter between the partial beam intercepter and the optical storage medium to provide an evanescent wave for impinging the optical storage medium in response to the second portion of the light beam.

10. A method of providing a light beam to an optical storage medium, comprising:

blocking a first portion of the light beam to form a modified light beam having an annular transverse cross-sectional shape;

generating an evanescent wave from the modified light beam.

* * * * *